United States Patent
Osborne

(10) Patent No.: US 10,288,100 B2
(45) Date of Patent: May 14, 2019

(54) SEAT TRACK STRUCTURAL SUPPORT FOR FLOOR PANELS

(71) Applicant: The Boeing Company, Chicago, IL (US)

(72) Inventor: John C. Osborne, Bothell, WA (US)

(73) Assignee: The Boeing Company, Chicago, IL (US)

(*) Notice: Subject to any disclaimer, the term of this patent is extended or adjusted under 35 U.S.C. 154(b) by 97 days.

(21) Appl. No.: 15/240,695

(22) Filed: Aug. 18, 2016

(65) Prior Publication Data

US 2018/0051732 A1 Feb. 22, 2018

(51) Int. Cl.
*F16B 5/02* (2006.01)
*F16B 5/12* (2006.01)
*B64D 11/06* (2006.01)

(52) U.S. Cl.
CPC .......... *F16B 5/123* (2013.01); *B64D 11/0696* (2013.01); *F16B 5/02* (2013.01)

(58) Field of Classification Search
CPC ........ F16B 5/123; F16B 5/06; B64D 11/0696; B64C 1/18; B64C 1/20
See application file for complete search history.

(56) References Cited

U.S. PATENT DOCUMENTS

| 2,916,159 | A | * | 12/1959 | O'Neill | F16B 2/245 |
| | | | | | 206/820 |
| 3,131,447 | A | * | 5/1964 | Tinnerman | F16L 3/24 |
| | | | | | 248/228.7 |
| 4,408,939 | A | * | 10/1983 | Graff | F16B 37/041 |
| | | | | | 411/112 |
| 5,353,571 | A | * | 10/1994 | Berdan | B60R 13/04 |
| | | | | | 24/293 |
| 7,370,831 | B2 | * | 5/2008 | Laib | B64C 1/18 |
| | | | | | 174/70 B |
| 2005/0169726 | A1 | | 8/2005 | McClure | |
| 2008/0310931 | A1 | * | 12/2008 | Csik | F16B 37/043 |
| | | | | | 411/103 |

OTHER PUBLICATIONS

Avibank Manufacturing Inc."E-Nut Fastners" https://www.avibank.com/products/e-nut-fastners.html Precision Castparts Corp. 2016.

* cited by examiner

*Primary Examiner* — Anita M King
(74) *Attorney, Agent, or Firm* — Perman & Green, LLP

(57) ABSTRACT

A panel support clip including a frame having a first engagement surface and at least one fastener retention feature, and a plurality of fingers each having a second engagement surface and a panel support surface opposite the second engagement surface, each of the plurality of fingers extends from the frame so that the second engagement surface opposes the first engagement surface to form a channel.

20 Claims, 15 Drawing Sheets

SEAT TRACK STRUCTURAL SUPPORT FOR FLOOR PANELS

BACKGROUND

1. Field

The exemplary embodiments generally relate to aircraft floor panel installation components and systems and in particular to panel support fasteners for fastening floor panels.

2. Brief Description of Related Developments

Aircraft floor panels are generally a composition of two sheets separated by a honeycomb core structure. For example, referring to FIGS. 15A and 15B, a representative floor panel 1000 for an aircraft is illustrated. The representative example of the floor panel 1000 generally is a composite layer structure including a first surface layer 1000T, a second surface layer 1000B and a honeycomb layer 1003 disposed between the two surface layers 1000T, 1000B. The floor panel 1000 also includes one or more insert 1001 having an insert body 1001B and insert flange 1001H with the insert body 1001B extended through an aperture located at an edge 1000E of the floor panel 1000. The one or more insert 1001 provides anti-crush bearing surfaces to fasten the floor panel 1000 to a seat track of the aircraft. A flange thickness TI of the insert flange 1001H prevents the bottom surface layer 1000B from contacting the seat track, thus creating a space along the edge 1000E between the floor panel 1000 and the seat track.

Without support in the spacing formed between the floor panel 1000 and seat track, the edge 1000E of the floor panel 1000 is subject to deformation when pressure is applied to the edge 1000E. Support is conventionally provided with cork tape 1002 adhered to the second surface layer 1000B between each insert flange 1001H along the edge 1000E. However, this increases the time it takes to install the panels and also increases the weight and cost of the panels.

Conventionally, floor panels in an aircraft are mounted using an e-nut system with support provided by the cork tape. The e-nut system is generally a blind side fastening system utilizing an expandable nut and screw combination for fastening two objects together to form a structural attachment. The e-nut includes radially flexible fingers that, after passing through the insert and corresponding hole in the seat track, expand against the hole in the seat track preventing the screw and nut from being removed and securing the floor panel to the seat track. The insert and lower flange provide support to the floor panel edge which is subject to point load crushing. E-nuts are generally expensive and add significant cost to the aircraft as they are used in large numbers.

It would be advantageous to provide a system which removes the need for cork tape as structural support and serves as a template to locate nuts allowing a blind side installation of the floor panels, reducing cost and time to install the panels.

SUMMARY

A panel support clip including a frame having a first engagement surface and at least one fastener retention feature, and a plurality of fingers each having a second engagement surface and a panel support surface opposite the second engagement surface, each of the plurality of fingers extends from the frame so that the second engagement surface opposes the first engagement surface to form a channel.

An aircraft comprising at least one aircraft seat track, and a panel support clip including, a frame having a first engagement surface and at least one fastener retention feature, and a plurality of fingers each having a second engagement surface and a panel support surface opposite the second engagement surface, each of the plurality of fingers extends from the frame so that the second engagement surface opposes the first engagement surface to form a channel.

A method of supporting an aircraft floor panel, the method comprising clipping a panel support clip on one or more seat track, and supporting at least one peripheral edge of the aircraft floor panel with finger support surfaces of the panel support clip.

BRIEF DESCRIPTION OF THE DRAWINGS

Figure 1:
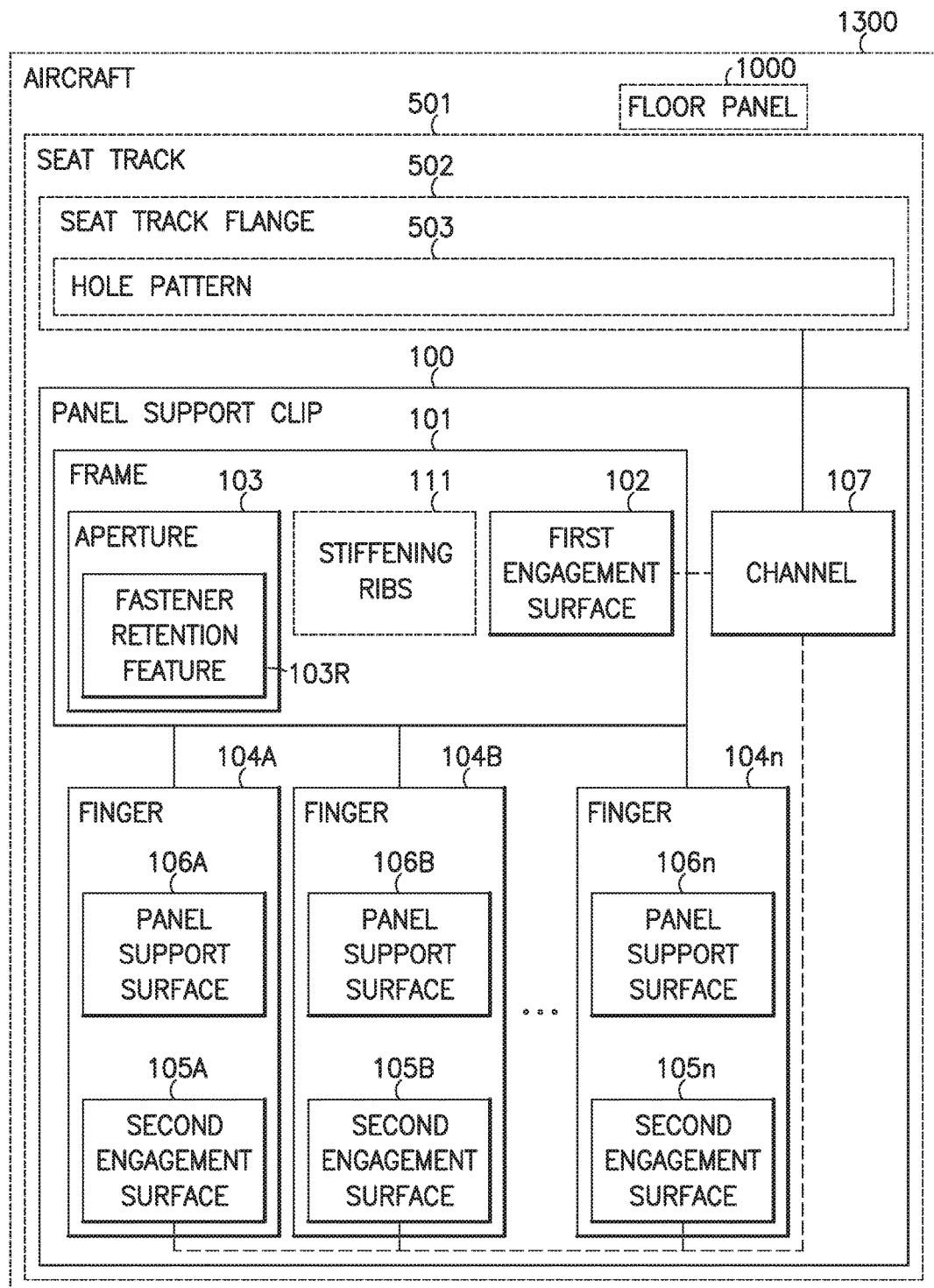
Figure 2:
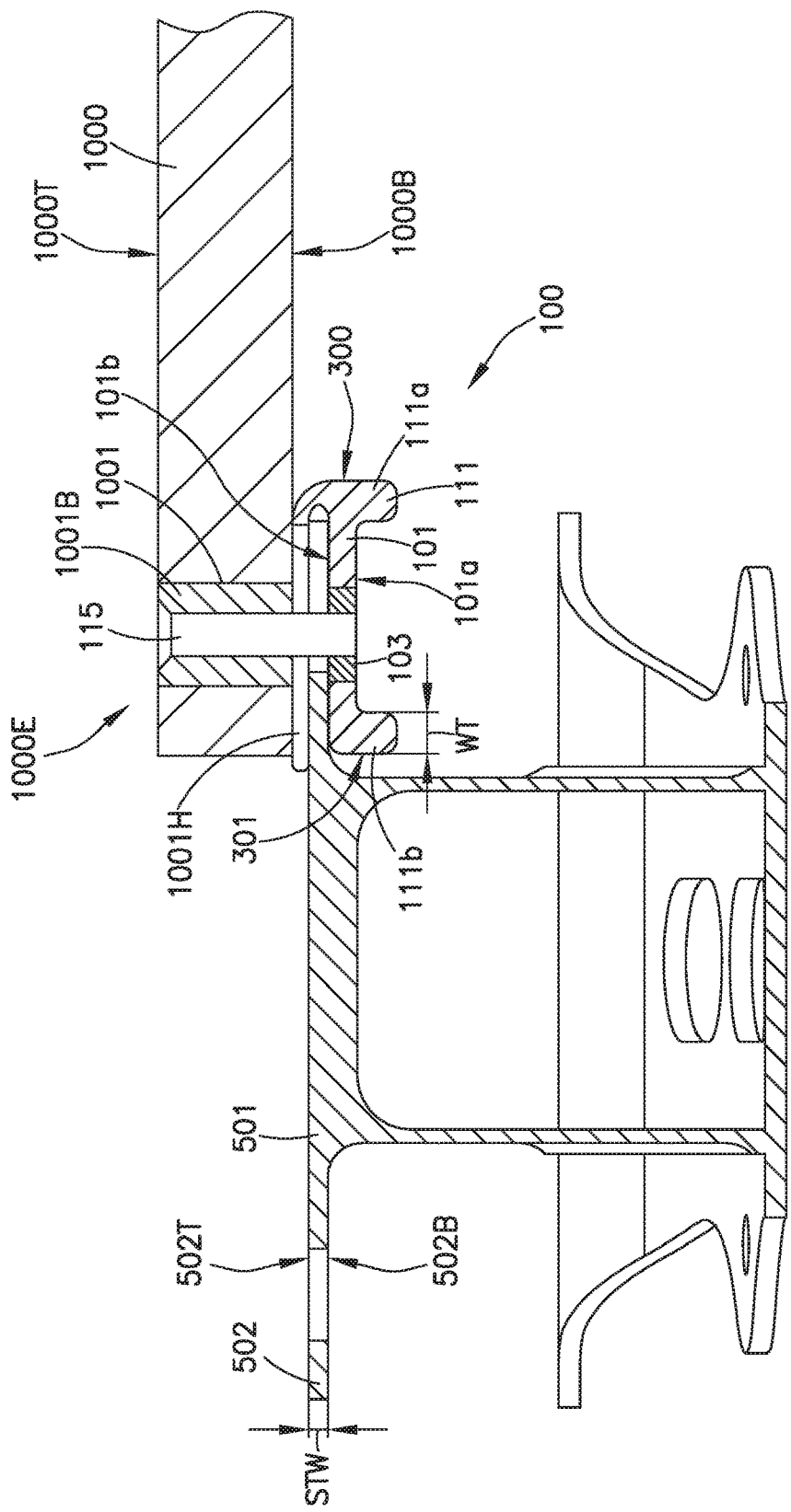
Figure 3:
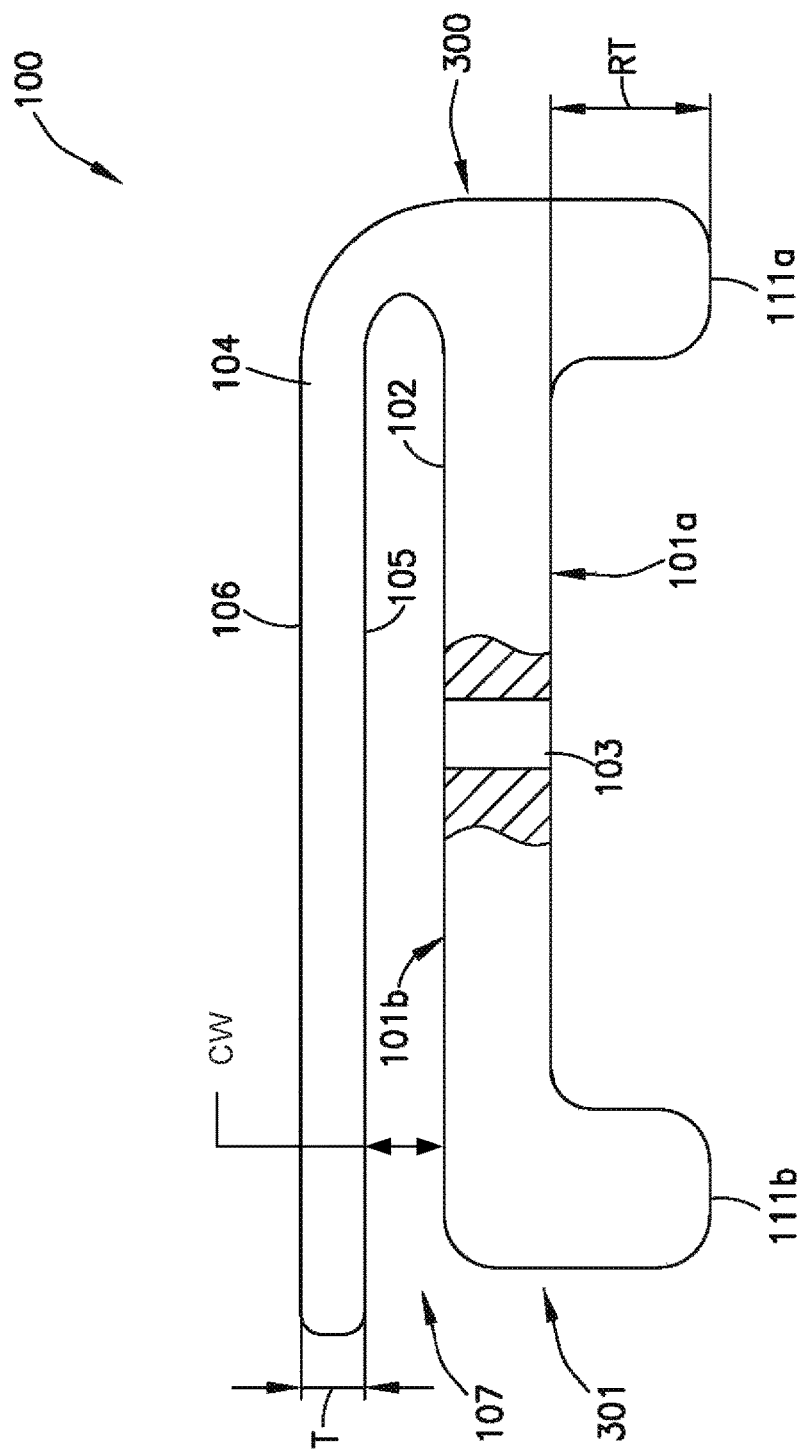
Figure 4:
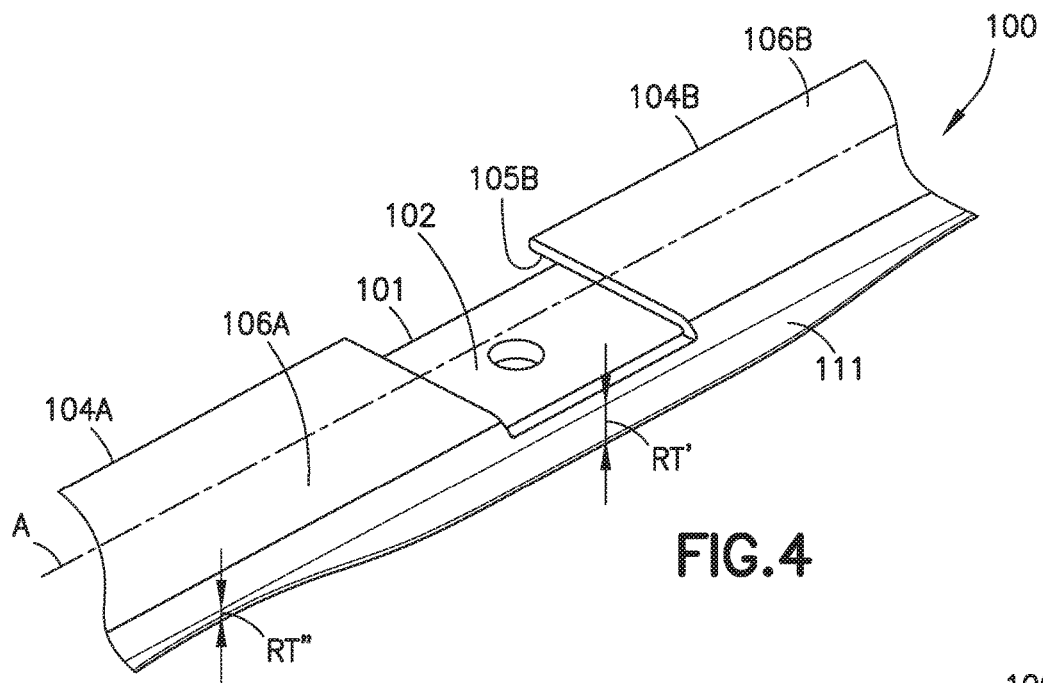
Figure 5:
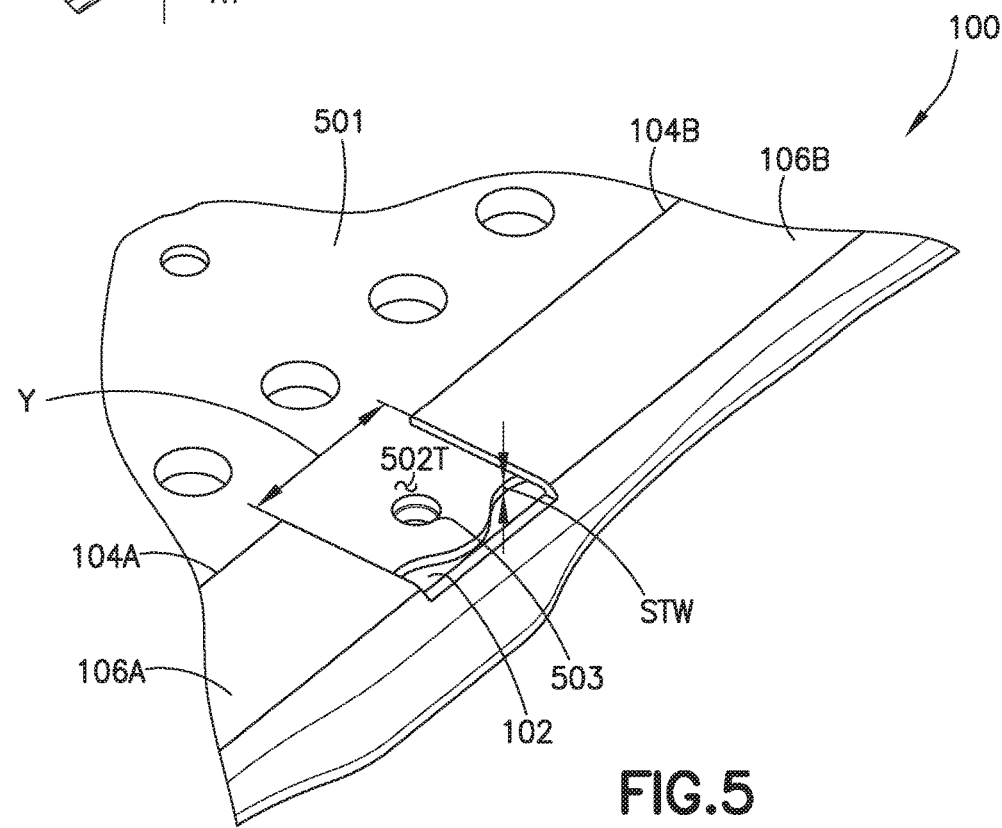
Figure 6:
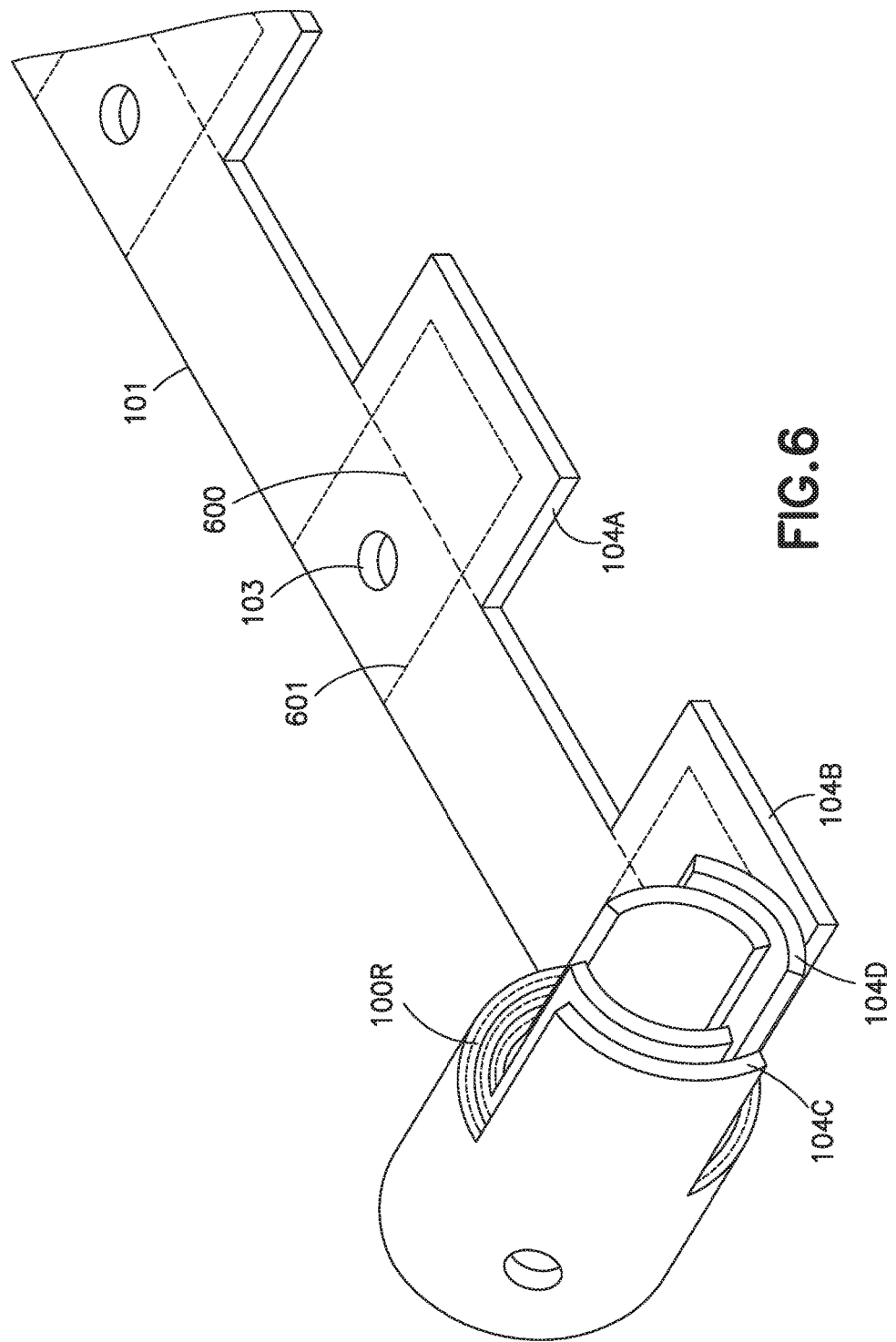
Figure 7:
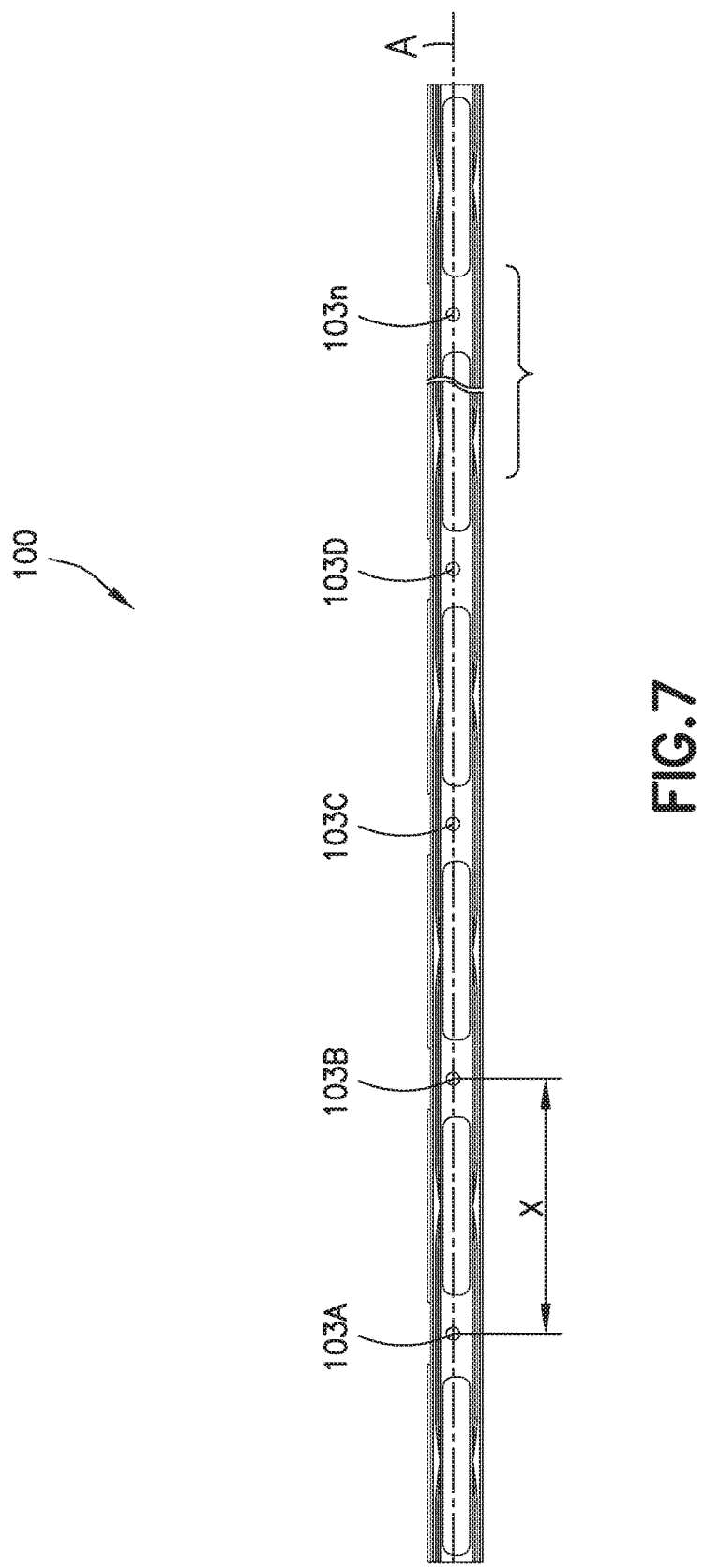
Figure 8:
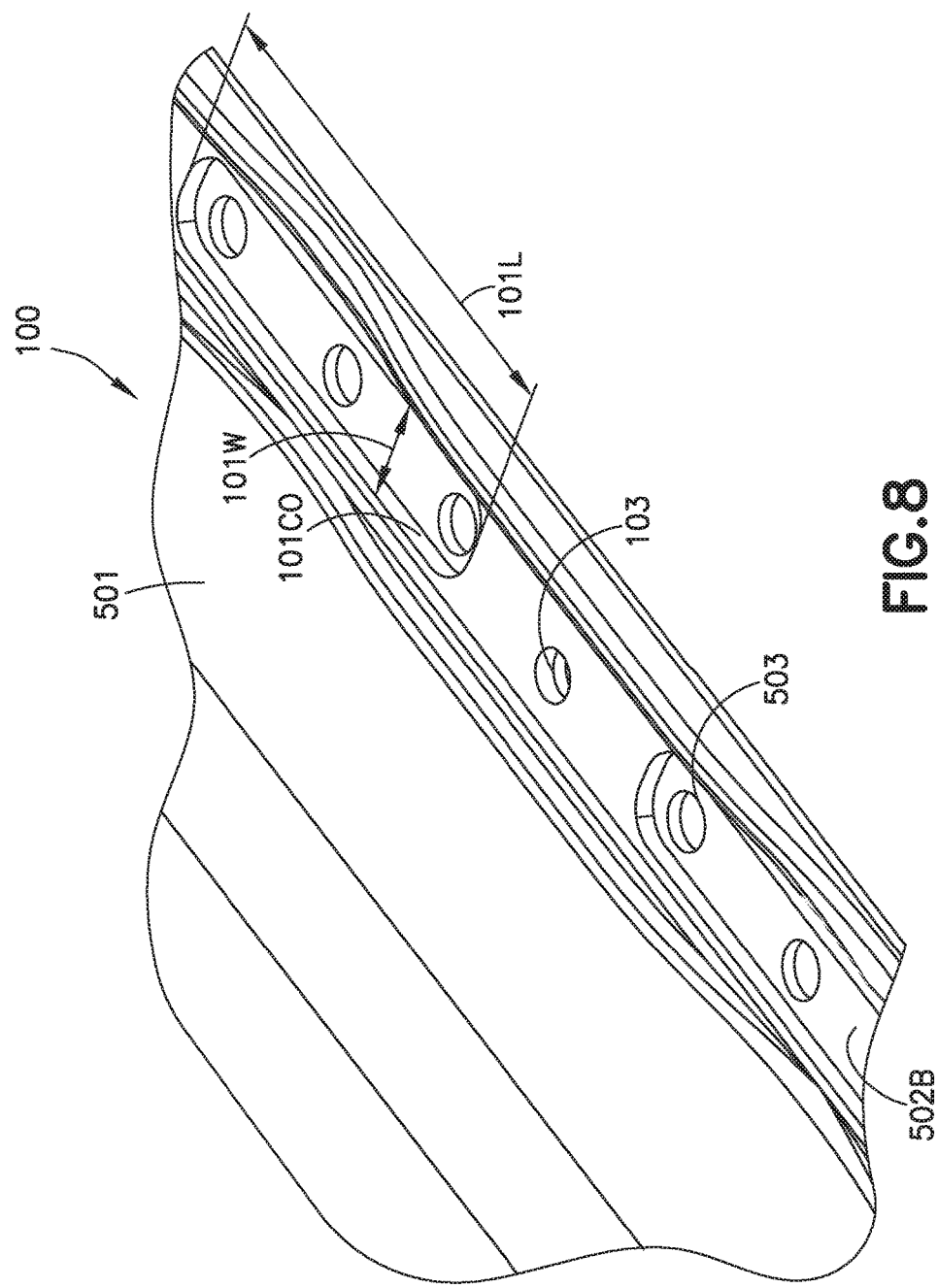
Figure 9:
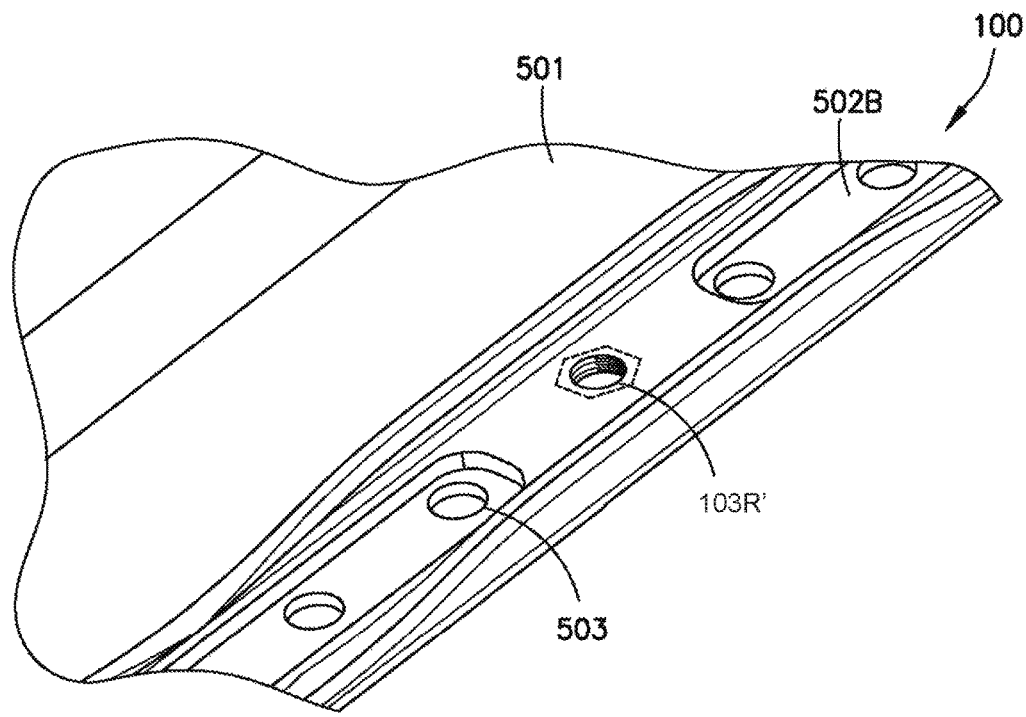
Figure 10:
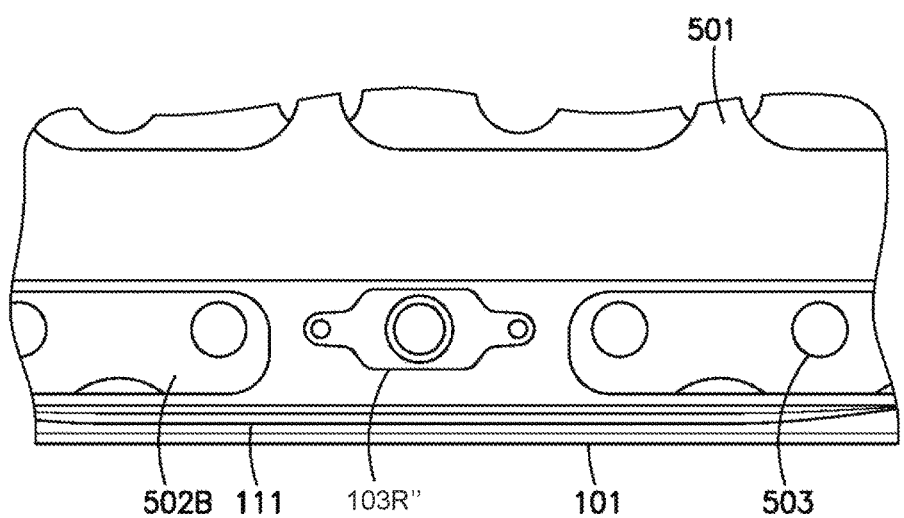
Figure 11:
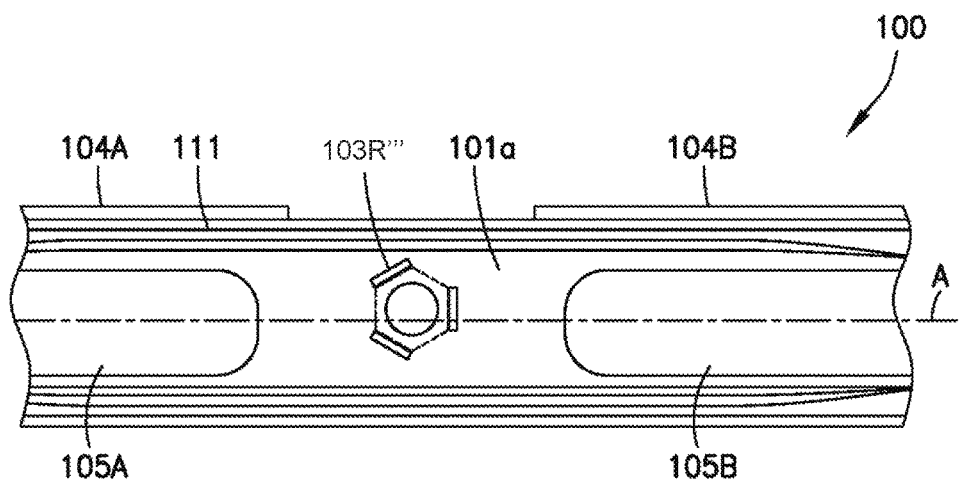
Figure 12:
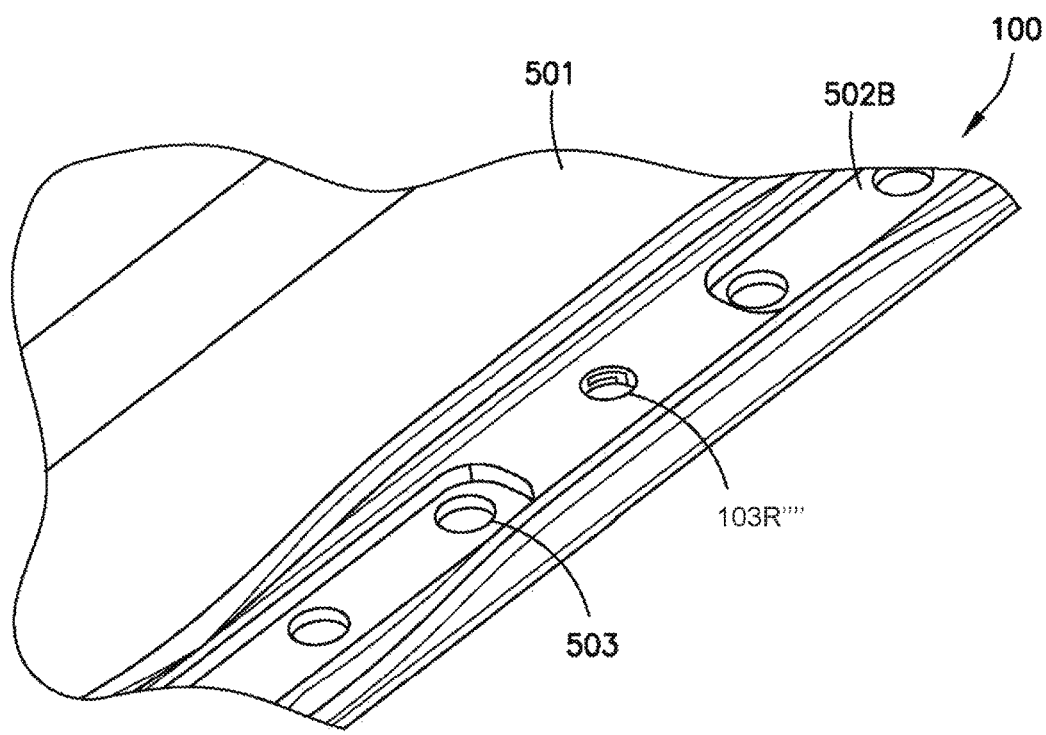
Figure 13A:
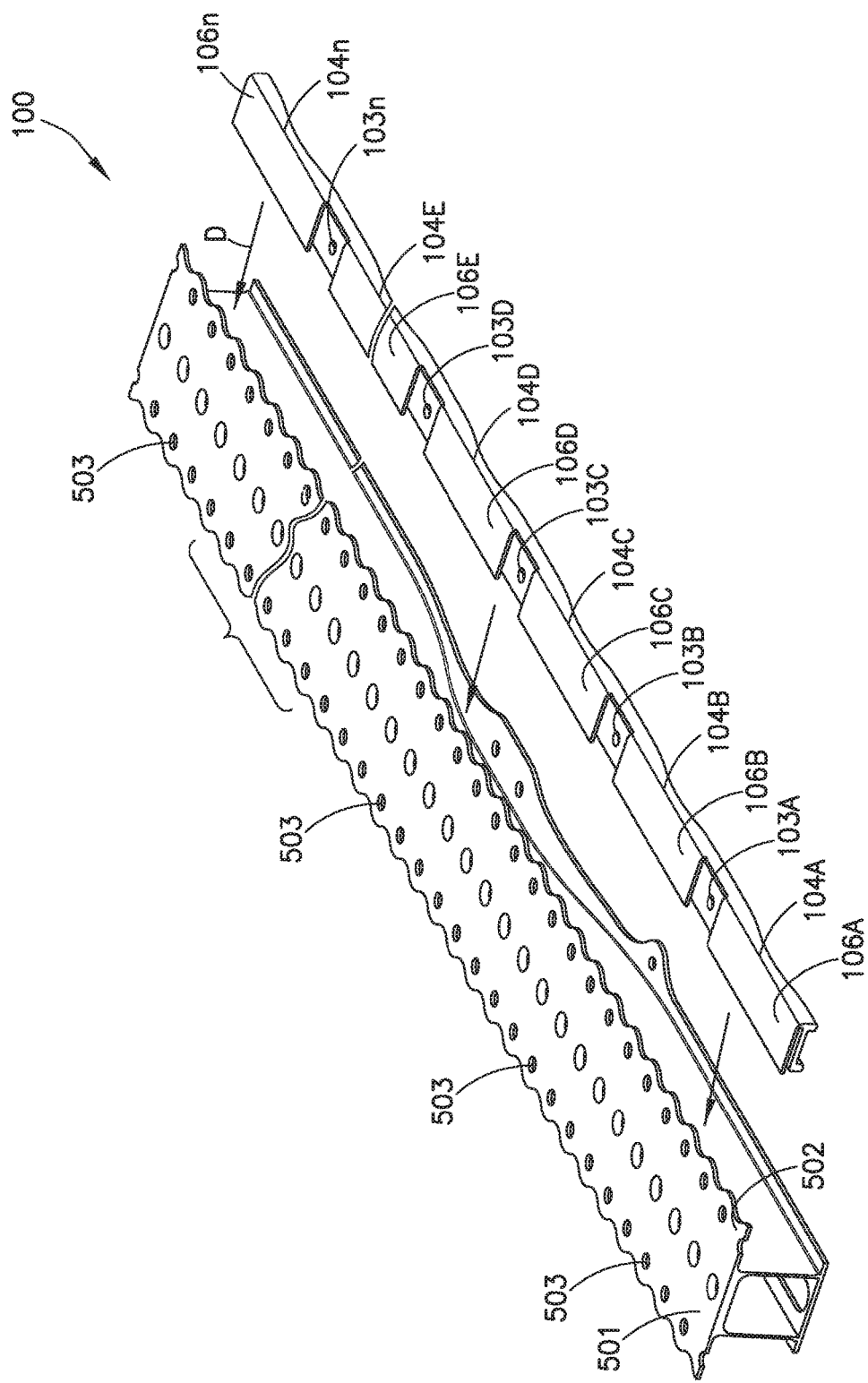
Figure 13B:
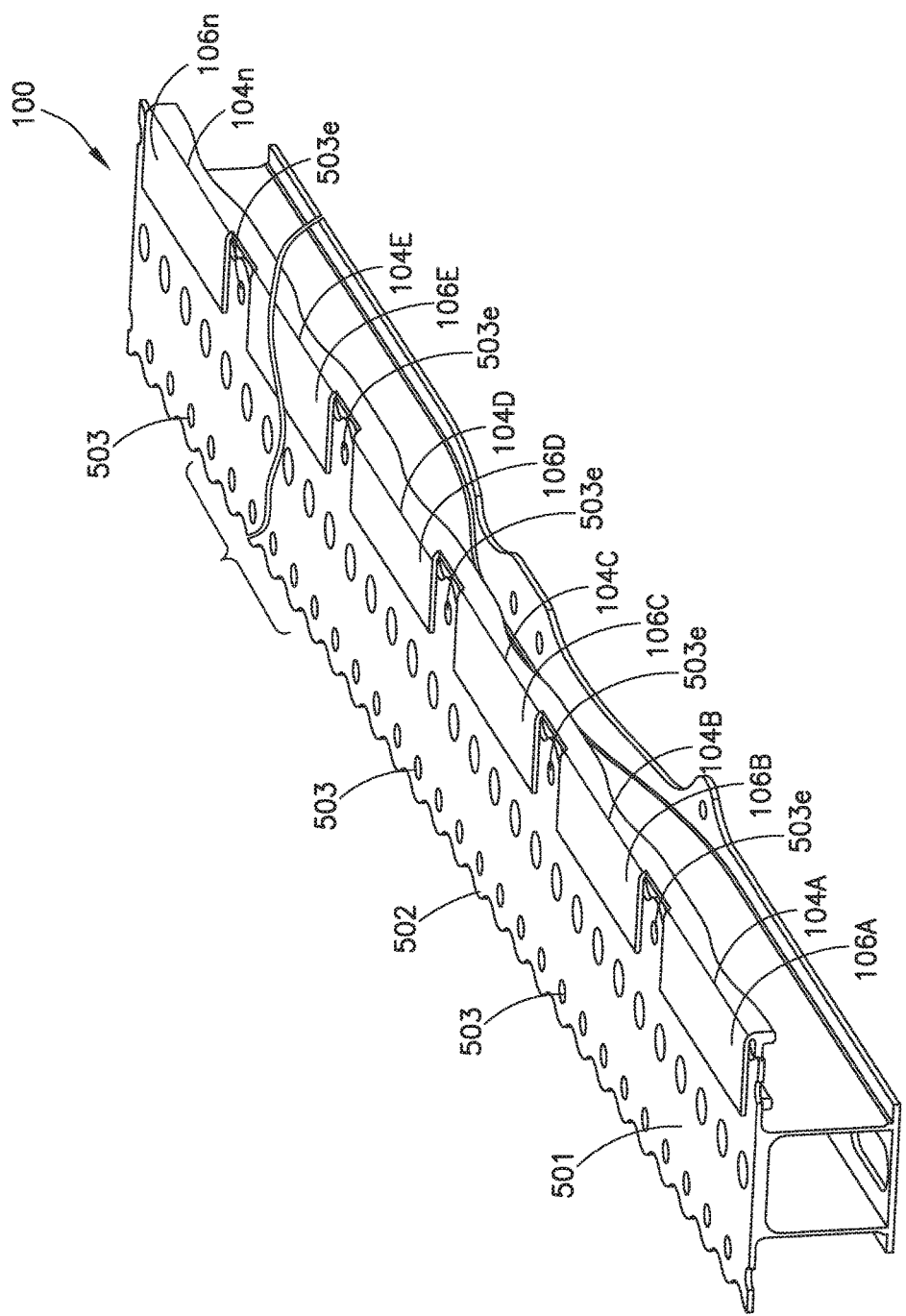
Figure 14:
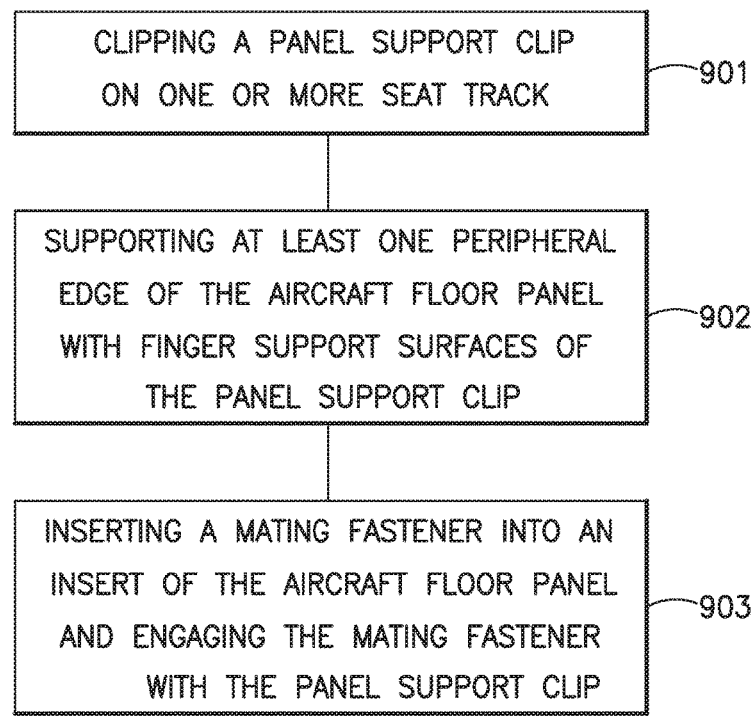
Figure 15A:
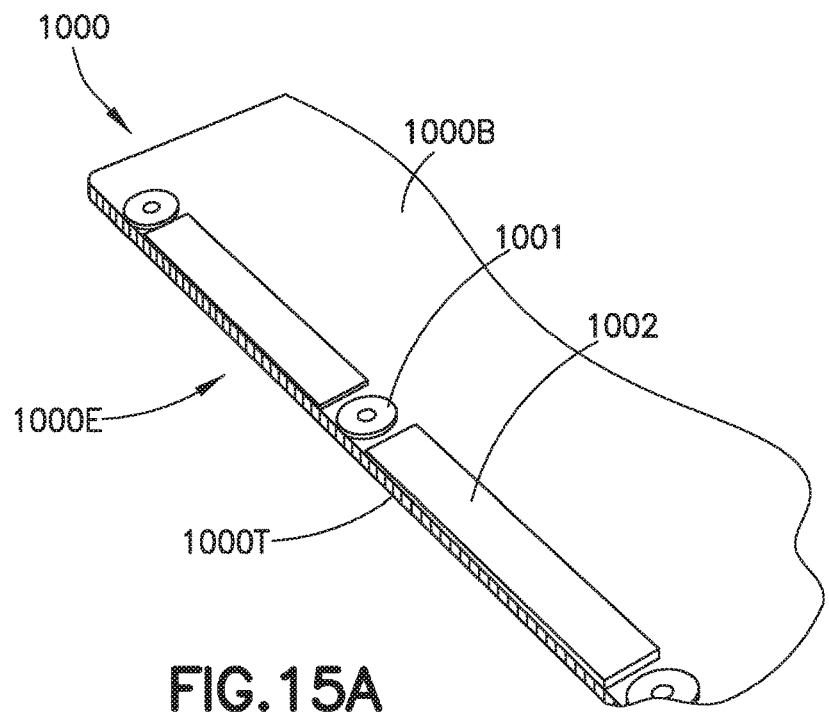
Figure 15B:
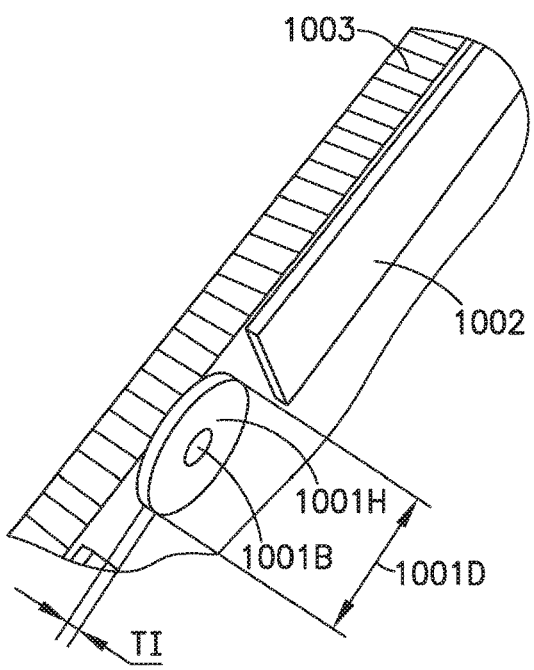
Figure 16:
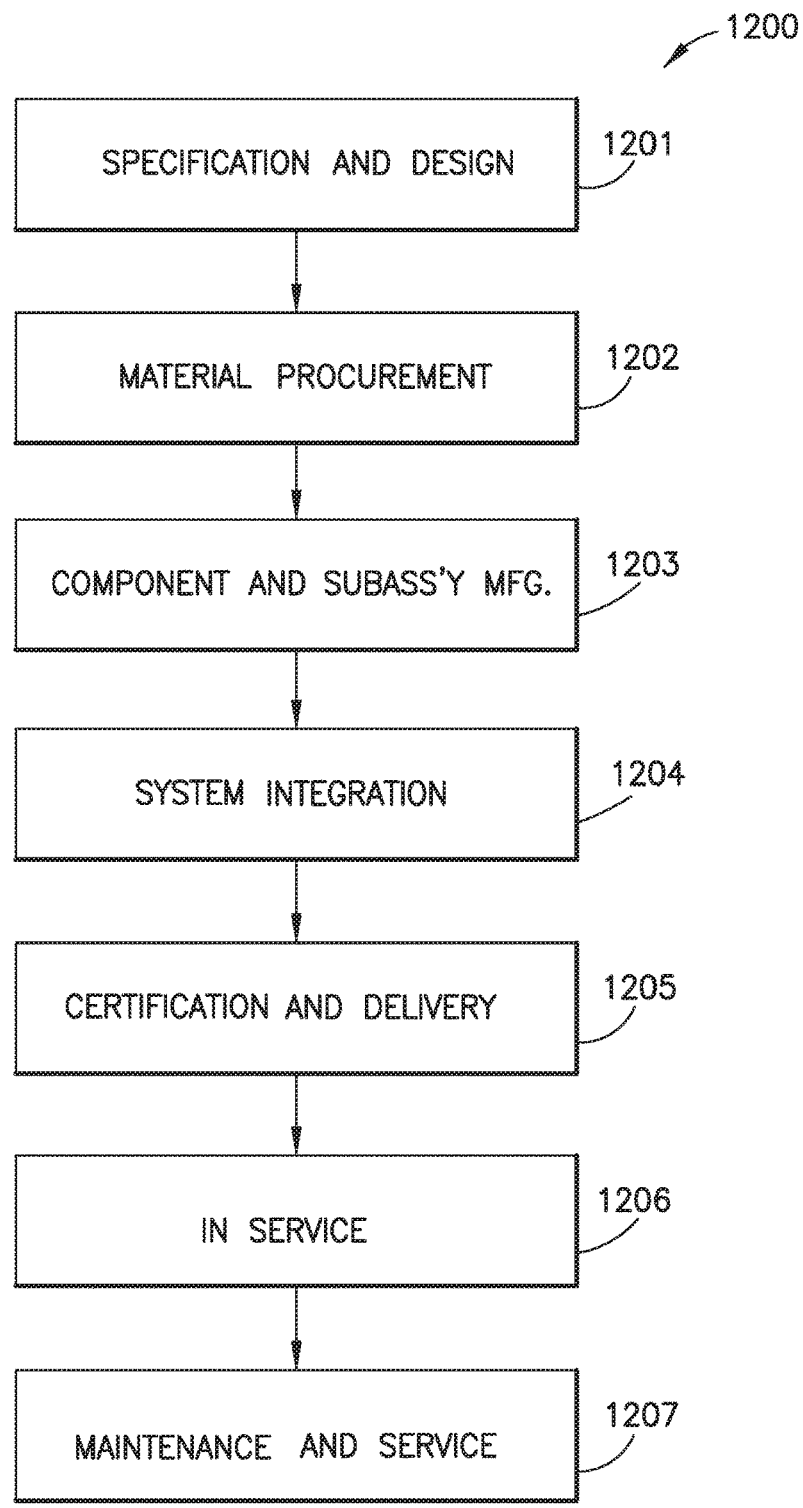
Figure 17:
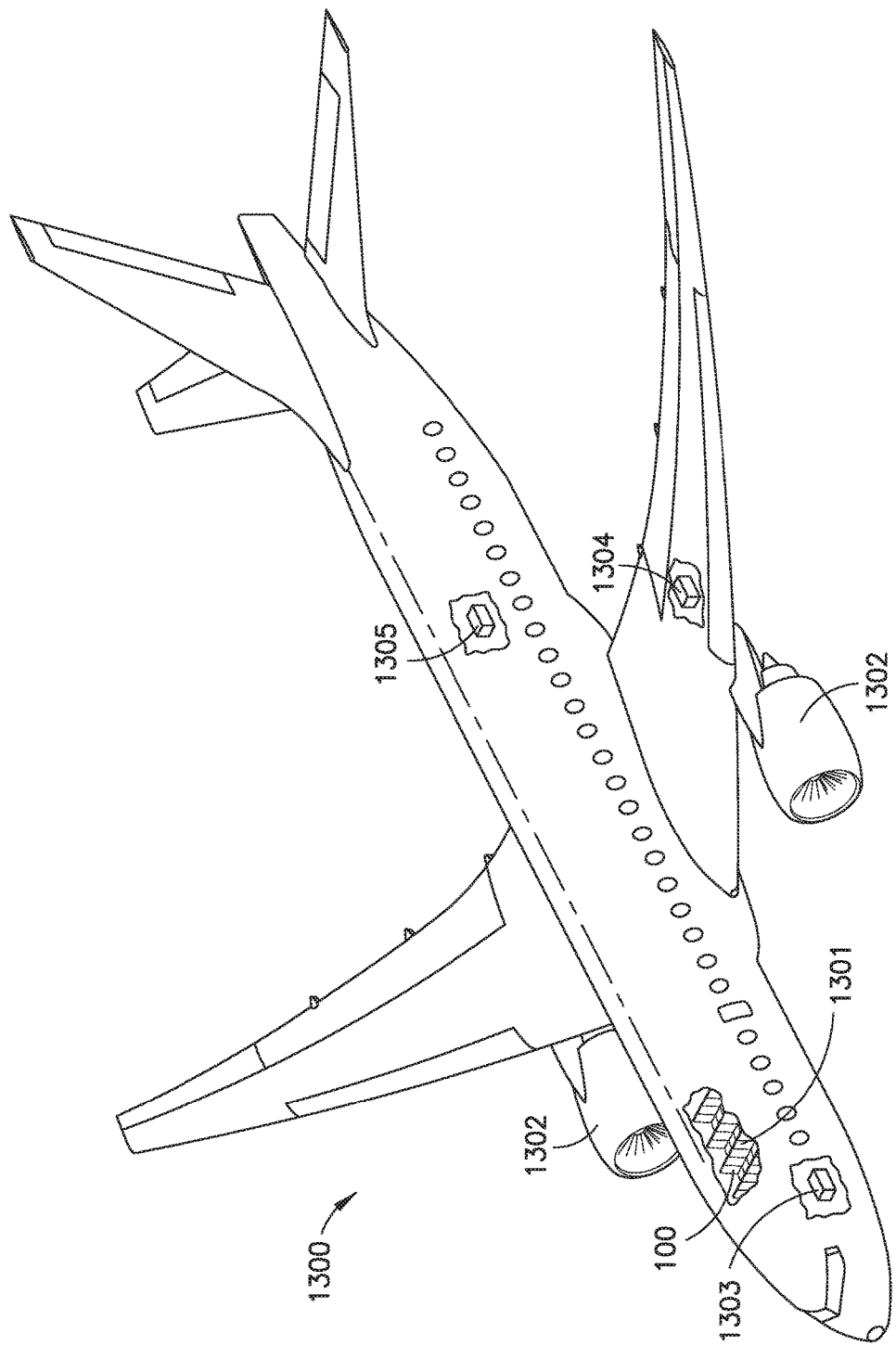

Having thus described examples of the disclosure in general terms, reference will now be made to the accompanying drawings, which are not necessarily drawn to scale, and wherein like reference characters designate the same or similar parts throughout, the several views, and wherein:

FIG. 1 is a block diagram of a panel support clip in accordance with one or more aspects of the present disclosure;

FIG. 2 is a schematic side view of a portion of the panel support clip in accordance with one or more aspects of the present disclosure;

FIG. 3 is a schematic side view of a portion of the panel support clip in accordance with one or more aspects of the present disclosure;

FIG. 4 is a schematic isometric view of a portion of the panel support clip in accordance with one or more aspects of the present disclosure;

FIG. 5 is a schematic isometric view of a portion of the panel support clip in accordance with one or more aspects of the present disclosure;

FIG. 6 is a schematic illustration of a portion of the panel support clip in accordance with one or more aspects of the present disclosure;

FIG. 7 is a schematic illustration of a portion of the panel support clip in accordance with one or more aspects of the present disclosure;

FIG. 8 is a schematic isometric view of a portion of the panel support clip in accordance with one or more aspects of the present disclosure;

FIG. 9 is a schematic isometric view of a portion of the panel support clip in accordance with one or more aspects of the present disclosure;

FIG. 10 is a schematic illustration of a portion of the panel support clip in accordance with one or more aspects of the present disclosure;

FIG. 11 is a schematic illustration of a portion of the panel support clip in accordance with one or more aspects of the present disclosure;

FIG. 12 is a schematic isometric view of a portion of the panel support clip in accordance with one or more aspects of the present disclosure;

FIGS. 13A-13B are schematic isometric views of the operation of clipping the panel support clip in accordance with one or more aspects of the present disclosure;

FIG. 14 is a flow diagram of a method of supporting an aircraft floor panel in accordance with one or more aspects of the present disclosure;

FIGS. 15A-15B are illustrations of conventional floor panels with an insert and cork tape attached;

FIG. 16 is a flow diagram of aircraft production and service methodology in accordance with one aspect of the present disclosure; and FIG. 17 is a schematic illustration of an aircraft in accordance with one or more aspects of the present disclosure.,

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring now to FIG. 1, the aspects of the present disclosure described herein provide for a panel support clip 100 configured for structurally supporting the floor panel 1000 in the aircraft 1300. The panel support clip 100 is configured to clip to the seat track 501 within the aircraft 1300 providing support for the floor panel 1000 and securing the floor panel 1000 to the seat track 501.

The panel support clip 100 generally includes a longitudinally extended frame 101 and a plurality of fingers 104A-n disposed along the frame 101 as will be described herein. The frame 101 and the plurality of fingers 104A-n are generally formed from one or more of plastic, a composite, or metal in any suitable manner such as additive manufacturing, extrusion, molding, etc. In one aspect, the frame 101 and the plurality of fingers 104A-n are formed from any suitable material. In one aspect, the panel support clip 100 may be manufactured in sections of any suitable length such as about 10 feet long, about 20 feet long or any other suitable length sufficient for installation in, for example, an aircraft or other vehicle/application. In one aspect, the panel support clip 100 may be cut to any desired length for installation in, for example, the aircraft.

Referring to FIGS. 1-5, the frame 101 includes a first engagement surface 102 and at least one aperture 103. In one aspect, the at least one aperture 103 may be at least a portion of a fastener retention feature 103R. Each finger 104 of the plurality of fingers 104A-n generally includes a second engagement surface 105 (see also respective second engagement surfaces 105A-n) and a panel support surface 106 (see also respective panel support surfaces 106A-n).

In one aspect, the frame 101 and the plurality of fingers 104A-n are formed as a one piece unitary member. In one aspect, the frame 101 and the plurality of fingers 104A-n are formed as at least two pieces, coupled together to form the panel support clip 100. In one aspect, the frame 101 and plurality of fingers 104A-n may be formed in any suitable manner.

Generally, the frame 101 extends longitudinally along longitudinal axis A, Referring to FIGS. 1-5 and 8, in one aspect, the frame 101 includes at least one cut out or aperture 101CO (seen best in FIG. 8) to reduce weight of the panel support clip 100. The at least one cut out 101CO may be located between each aperture 103 or may be located in any suitable location on the frame 101. The at least one cut out 101CO has any suitable length 101L along longitudinal axis A and has any suitable lateral width 101W.

Generally, the plurality of fingers 104A-n depend from the first lateral side 300 of the frame 101 to form a channel 107 with the frame 101. The plurality of fingers 104A-n extend from the first lateral side 300 towards the second lateral side 301 of the panel support clip 100 where the second engagement surfaces 105A-n are adjacent, to and are spaced from the first engagement surface 102, so that, the first engagement surface 102 on the frame 101 opposes the second engagement surfaces 105A-n on the plurality of fingers 104A-n forming the channel 107 between the plurality of fingers 104A-n and the frame 101. The channel 107 generally has a channel width CW corresponding to a seat track flange width STW of the seat track flange 502 such that the seat track flange 502 may be inserted into the channel 107.

Referring to FIGS. 2-3, in one aspect, the channel width CW is sized relative to the seat track flange width STW to have an interference fit so that the panel support clip 100 is self-retained on the seat track 501. As described above, the first engagement surface 102 and the second engagement surfaces 105A-n form the walls of the channel 107. The seat track flange 502 is inserted into the channel 107. In one aspect, the first engagement, surface 102 of the frame 101 is located on a second side 101b of the frame 101 opposite the first side 101a and is configured to engage a first surface 502B of the seat track flange 502. In one aspect, the second engagement surfaces 105A-n of the plurality of fingers 104A-n are configured to engage a second surface 502T of the seat track flange 502. The first and second engagement surfaces 102, 105A-n of the panel support clip 100 are configured to apply a retention force to the second surface 502T and first surface 502B of the seat track flange 502 such that the panel support clip 100 is clipped or retained on the seat track 501. The retention force may be accomplished via friction, such that, the channel width CW is smaller than the seat track flange width STW so that friction between the first and second engagement surfaces 102, 105A-n and the first and second surfaces 502B, 502T of the seat track 502 cause the panel support clip 100 to be retained on the seat track 502. In one aspect, the channel width CW may be sized to have a clearance fit relative to the seat track flange width STW.

Referring again to FIGS. 1-3 and 5, in one aspect, the panel support surfaces 106A-n of the plurality of fingers 104A-n are configured to engage the second surface layer 1000B of the floor panel 1000 to support the floor panel 1000. In one aspect, the plurality of fingers 104A-n are spaced a distance Y from one another where the distance Y is substantially the same as the diameter 1001D of the insert flange 1001H. In one aspect, the distance Y is sized for a clearance fit between the plurality of fingers 104A-n and the insert flange 1001H so the insert flange 1001H engages the second surface 502T of the seat track flange 502. In one aspect, the plurality of fingers 104A-n are formed with a finger thickness T such that the finger thickness T of the plurality of fingers 104A-n corresponds to the flange thickness TI of the insert flange 1001H. In one aspect, the finger thickness T of the plurality of fingers 104A-n is substantially the same as the flange thickness TI of the insert flange 1001H. In one aspect, the panel support surfaces 106A-n and the insert flange 1001H cooperate such that the panel support surfaces 106A-n and the insert flange 1001H form a substantially continuous support surface to support the floor panel 1000.

Referring now to FIG. 1-4, in one aspect, the frame 101 includes stiffening ribs 111 to increase the longitudinal rigidity of the panel support clip 100. In one aspect, the frame 101 includes two stiffening ribs 111a and 111b, each positioned on the first side 101a of the frame 101 extending along longitudinal axis A. In one aspect, the first rib 111a is adjacent the first lateral side 300 and has a thickness WT, and the second rib 111b is adjacent the second lateral side 301 and also has a thickness WT. In one aspect the thickness WT of the ribs 111a, 111b is substantially equal, while in one aspect, the thicknesses are different where one rib 111a, 111b may be thicker than the other. In one aspect, the stiffening ribs 111a, 111b are scalloped, such that a thickness RT along the length of the panel support clip 100 varies. For example, the longitudinal thickness RT' of the stiffening ribs 111a, 111b adjacent the at least one aperture 103 may be thicker than a thickness RT" of the stiffening ribs 111a, 111b adjacent the plurality of fingers 104A-n. In one aspect, the thickness RT' is thicker to provide rigidity to the frame, while thickness RT" has a smaller thickness due to the plurality of fingers 104A-n providing rigidity at these points. In one aspect, each rib 111a, 111b spans substantially the entire length of the frame 101, while in one aspect, the ribs 111a, 111b may be sectional (i.e., broken up and spanning only sections of the panel support clip 100). While two ribs 111a, 111b are illustrated, in one aspect, the frame 101 may include more or less than two ribs. In one aspect, the stiffening ribs 111 have any suitable length extending along longitudinal axis A of the panel support clip 100, and/or the stiffening ribs 111 may be any suitable thickness.

In one aspect, referring to FIGS. 4 and 6, the panel support clip 100 may be formed from a flexible material so that the panel support clip 100 may be rolled at manufacture for storage and transport. For example, the thickness RT''' may define a flexure region for bending the panel support clip 100 so that the panel support clip 100 may be rolled. In one aspect, the panel support clip 100 mat not include stiffening ribs 111. In one aspect, the panel support clip 100 may be formed in a substantially flat configuration that may be rolled as shown in FIG. 6. Upon arrival at a work site, the rolled panel support clip 100R is unrolled and folded along fold line 600 to form the panel support clip 100. In one aspect, the rolled panel support clip 100R includes wire or foil 601 to retain the folded shape (i.e., the plurality of fingers 104A-n being folded over the frame 101). The panel support clip 100 may be manufactured to any suitable length and cut to any suitable length for installation on the seat track 501.

Referring now to FIGS. 1 and 7, in one aspect, at least one fastener retention feature 103R is located on the frame 101. In one aspect, the at least one fastener retention feature 103R generally includes a plurality of fastener retention features 103A-n. In one aspect, the plurality of fastener retention features 103A-n are disposed along longitudinal axis A of the frame 101. In one aspect, the fastener retention features 103A-n may be disposed in any suitable locations along the frame 101. In one aspect, the plurality of fastener retention features 103A-n are spaced a distance X from one another. In one aspect, the distance X corresponds to a hole pattern 503 of the seat track 501.

Referring to FIGS. 2 and 8, the at least one fastener retention feature 103R is generally configured to engage a mating fastener 115 provided to secure the floor panel 1000 to the seat track 502. In one aspect, the at least one fastener retention feature 103R is a recessed threaded portion in the aperture 103 of the frame 101. Referring to FIG. 9, in one aspect, the at least one fastener retention feature 103R' is a threaded fastener insert, such as a nut, integrated (i.e., molded or welded) into the frame 101. Referring to FIG. 10, in one aspect, the at least one fastener retention feature 103R" is at least one nut plate, aligned with the at least one aperture 103 and fastened to the first side 101a of the frame 101 in any suitable manner such as by rivets, welding, etc. Referring to FIG. 11, in one aspect, the at least one fastener retention feature 103R'" includes at least one plurality of protrusions circumferentially spaced around the at least one aperture 103 and configured to receive and hold a nut, where the nut is configured to receive the mating fastener 115 to secure the floor panel 1000 to the seat track 502. Referring to FIG. 12, in one aspect, the at least one fastener retention feature 103R"" is at least, one quick connect fastener formed in the at least one aperture 103, such as a quarter turn fastener or a clip.

Referring now to FIGS. 2, 13A-13B and 14, in operation, the panel support clip 100 is positioned such that the at least one fastener retention feature 103 is aligned with the hole pattern 503 of the seat track 501 and the channel 107 is aligned with the seat track flange 502.

The panel support clip 100 is moved in direction D to clip the panel support clip 100 on to the seat track 501 (FIG. 14, Block 901), such that the seat track flange 502 is inserted into the channel 107 of the panel support clip 100 (i.e., the frame 101 and the plurality of fingers 104A-n are clipped to or wrapped around the seat track flange 502 of the seat track 501). The first engagement, surface 102 of the frame 101 engages the first surface 502B of the seat track flange 502 while the second engagement surfaces 105A-n of the plurality of fingers 104A-n engage the second surface 502T of the seat track flange 502 applying a retention force to the seat track flange 502.

The floor panel 1000 is position over the seat track 501 and the panel support clip 100 such that the insert 1001 of the floor panel 1000 is aligned with the exposed hole pattern 503e of the seat track 501 between the plurality of fingers 104A-n. The edge 1000E of the floor panel is placed on top of the panel support clip 100 in contact, with the panel support surfaces 106A-n while the insert head 1001H engages the exposed area of the seat track flange 502 between the plurality of fingers 104A-n, where the panel support surfaces 106A-n and the insert flange 1001H provide the substantially continuous support surface supporting the edge 1000E of the floor panel 1000 (FIG. 14, Block 902).

A mating fastener 115 is inserted into each fastener retention feature 103 securing the floor panel 1000 to the panel support clip 100 (FIG. 14, Block 903).

Examples of the disclosure may be described in the context of an aircraft manufacturing and service method 1200 as shown in FIG. 16 and an aircraft 1300 as shown in FIG. 17. During pre-production, illustrative method 1200 may include specification and design 1201 of the aircraft 1300 and material procurement 1202. During production, component and subassembly manufacturing 1203, in one aspect including placement and integration of the panel support clip 100 described herein, and system integration 1204 of the aircraft 1300 take place. Thereafter, the aircraft 1300 may go through certification and delivery 1205 to be placed in service 1206. While in service by a customer, the aircraft 1300 is scheduled for routine maintenance and service 1207.

Processes of the illustrative method 1200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, the aircraft 1300 produced by the illustrative method 1200 may include a plurality of high-level systems and an interior 1301, including one or more floor panel 1000 and one or more panel support clip 100. Examples of high-level systems, which are distributed throughout the aircraft, include one or more of a propulsion system 1302, an electrical power system 1303, a hydraulic system 1304, and the environmental control system 1305. Any number of other systems may be included. The principles of the invention may be applied to other industries, such as automotive industries.

Apparatus and methods shown or described herein may be employed during any one or more of the stages of the manufacturing and service method 1200. For example, components or subassemblies corresponding to component and subassembly manufacturing 1203 may be fabricated or manufactured in a manner similar to components or subassemblies produced while the aircraft 1300 is in service. Also, one or more aspects of the apparatus, method, or combination thereof may be utilized during the production states 1203 and 1204, for example, by substantially expediting assembly of or reducing the cost of an aircraft 1300.

In accordance with one or more aspects of the present disclosure the following are provided:

A. A panel support clip comprising:
a frame having a first engagement surface and at least one fastener retention feature; and
a plurality of fingers each having a second engagement surface and a panel support surface opposite the second engagement surface, each of the plurality of fingers extends from the frame so that the second engagement surface opposes the first engagement surface to form a channel.

A1. The panel support clip of paragraph A, wherein the at least one fastener retention feature comprises a plurality of fastener retention features longitudinally spaced from one another along the frame, a spacing between each of the plurality of fastener retention features corresponding to a hole pattern of an aircraft seat track.

A2. The panel support clip of paragraph A, wherein the at least one fastener retention feature is on a side of the frame opposite the first engagement surface.

A3. The panel support clip of paragraph A, wherein the at least one fastener retention feature comprises an aperture formed in the frame.

A4. The panel support clip of paragraph A3, wherein the aperture is a threaded aperture.

A5. The panel support clip of paragraph A3, wherein the at least one fastener retention feature includes protrusions configured to receive and retain a fastener on the frame in alignment with the aperture.

A6. The panel support clip of paragraph A, wherein the at least, one fastener retention feature is a threaded fastener.

A7. The panel support clip of paragraph A6, wherein the threaded fastener is one or more of a nut or a nut plate.

A8. The panel support clip of paragraph A, wherein the at least one fastener retention feature is at least a portion of a quick connect fastener.

A9. The panel support clip of paragraph A8, wherein the quick connect fastener is one or more of a quarter turn fastener or a clip.

A10. The panel support clip of paragraph A3, wherein the at least one fastener retention feature includes a threaded fastener integrated into the frame in alignment with the aperture.

A11. The panel support clip of paragraph A, wherein the channel is configured to receive an aircraft seat track flange where the first engagement surface and second engagement surface are configured to engage opposite sides of the aircraft seat track flange.

A12. The panel support clip of paragraph A11, wherein the channel is sized so that a retention force is applied by the panel support clip on the aircraft seat track flange to retain the panel support clip on the aircraft seat track flange.

A13. The panel support clip of paragraph A, wherein a thickness of each of the plurality of fingers corresponds to a thickness of an aircraft floor panel fastener insert.

A14. The panel support clip of paragraph A, wherein each panel support surface of the plurality of fingers cooperate with one or more aircraft floor panel inserts to form, with the one or more aircraft floor panel inserts, a substantially continuous support surface for an aircraft floor panel.

A15. The panel support clip of paragraph A, wherein the frame and the plurality of fingers are formed as a one piece unitary member.

A16. The panel support clip of paragraph A, wherein the panel support clip comprises one or more of a plastic, a composite and a metal.

A17. The panel support clip of paragraph A, wherein the frame includes stiffening ribs.

A18. The panel support clip of paragraph A17, wherein the stiffening ribs are arranged to extend longitudinally along the frame.

A19. The panel support clip of paragraph A, wherein the panel support clip comprises a flexible material so that the panel support clip bends along a longitudinal length of the panel support clip.

B. An Aircraft Comprising
at least one aircraft seat track; and
a panel support clip including,
a frame having a first engagement surface and at least one fastener retention feature, and
a plurality of fingers each having a second engagement surface and a panel support surface opposite the second engagement surface, each of the plurality of fingers extends from the frame so that the second engagement surface opposes the first engagement surface to form a channel.

B1. The aircraft of paragraph B, wherein the at least one fastener retention feature comprises a plurality of fastener retention features longitudinally spaced from one another along the frame, a spacing between each of the plurality of fastener retention features corresponding to a hole pattern of the at least one aircraft seat track.

B2. The aircraft of paragraph B, wherein the at least one fastener retention feature is on a side of the frame opposite the first engagement surface.

B3. The aircraft of paragraph B, wherein the at least one fastener retention feature comprises an aperture formed in the frame.

B4. The aircraft of paragraph B3, wherein the aperture is a threaded aperture.

B5. The aircraft of paragraph B3, wherein the at least one fastener retention feature includes protrusions configured to receive and retain a fastener on the frame in alignment with the aperture.

B6. The aircraft of paragraph B, wherein the at least one fastener retention feature is a threaded fastener.

B7. The aircraft of paragraph B6, wherein the threaded fastener is one or more of a nut or a nut plate.

B8. The aircraft of paragraph B, wherein the at least one fastener retention feature is at least a portion of a quick connect fastener.

B9. The aircraft of paragraph B8, wherein the quick connect fastener is one or more of a quarter turn fastener or a clip.

B10. The aircraft of paragraph B3, wherein the at least one fastener retention feature includes a threaded fastener molded within the frame in alignment with the aperture.

B11. The aircraft of paragraph B, wherein the channel is configured to receive an aircraft seat, track flange where the first engagement surface and second engagement surface are configured to engage opposite sides of the aircraft seat track flange.

B12. The aircraft of paragraph B11, wherein the channel is sized so that a retention force is applied by the panel support clip on the aircraft seat, track flange to retain the panel support clip on the aircraft seat track flange.

B13. The aircraft of paragraph B, wherein a thickness of each of the plurality of fingers corresponds to a thickness of an aircraft floor panel fastener insert.

B14. The aircraft of paragraph B, wherein each panel support surface of the plurality of fingers cooperate with one or more aircraft floor panel inserts to form, with the one or more aircraft floor panel inserts, a substantially continuous support surface for an aircraft floor panel.

B15. The aircraft of paragraph B, wherein the frame and the plurality of fingers are formed as a one piece unitary member.

B16. The aircraft of paragraph B, wherein the panel support clip comprises one or more of a plastic, a composite and a metal.

B17. The aircraft of paragraph B, wherein the frame includes stiffening ribs.

B18. The aircraft of paragraph B17, wherein the stiffening ribs are arranged to extend longitudinally along the frame.

B19. The aircraft, of paragraph B, wherein the panel support clip comprises a flexible material so that the panel support clip bends along a longitudinal length of the panel support clip.

C. A method of supporting an aircraft floor panel, the method comprising:

clipping a panel support, clip on one or more seat track; and supporting at least one peripheral edge of the aircraft floor panel with finger support surfaces of the panel support clip.

C1. The method of paragraph C, further comprising retaining the panel support clip on the one or more seat track by inserting a seat track flange into a channel formed between the finger support surfaces and a frame of the panel support clip.

C2. The method of paragraph C, further comprising aligning a floor panel insert between the finger support surfaces so that the floor panel insert contacts the one or more seat track.

C3. The method of paragraph C2, further comprising inserting a fastener through the floor panel insert to engage the panel support clip and secure the aircraft floor panel to the one or more seat track.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A panel support clip comprising:
   a frame having a first engagement surface and more than one fastener retention feature; and
   a plurality of fingers each having a second engagement surface and a panel support surface opposite the second engagement surface, each of the plurality of fingers extends from the frame so that the second engagement surface opposes the first engagement surface to form a channel and where the plurality of fingers are spaced apart from one another along the frame so as to form apertures that are disposed on an opposite side of the channel from the more than one fastener retention feature so that the apertures are substantially aligned with a respective fastener retention feature of the more than one fastener retention feature, where the respective fastener retention feature is aligned with a respective aperture to effect passage of a floor panel fastening member through the respective aperture into the respective fastener retention feature.

2. The panel support clip of claim 1, wherein the more than one fastener retention feature comprises a plurality of fastener retention features longitudinally spaced from one another along the frame, a spacing between each of the plurality of fastener retention features corresponding to a hole pattern of an aircraft seat track.

3. The panel support clip of claim 1, wherein the more than one fastener retention feature is on a side of the frame opposite the first engagement surface.

4. The panel support clip of claim 1, wherein the more than one fastener retention feature is a threaded fastener.

5. The panel support clip of claim 4, wherein the threaded fastener is one or more of a nut or a nut plate.

6. The panel support clip of claim 1, wherein the channel is configured to receive an aircraft seat track flange where the first engagement surface and second engagement surface are configured to engage opposite sides of the aircraft seat track flange.

7. The panel support clip of claim 6, wherein the channel is sized so that a retention force is applied by the panel support clip on the aircraft seat track flange to retain the panel support clip on the aircraft seat track flange.

8. The panel support clip of claim 1, wherein a thickness of each of the plurality of fingers corresponds to a thickness of an aircraft floor panel fastener insert.

9. The panel support clip of claim 1, wherein each panel support surface of the plurality of fingers cooperate with one or more aircraft floor panel inserts to form, with the one or more aircraft floor panel inserts, a substantially continuous support surface for an aircraft floor panel.

10. The panel support clip of claim 1, wherein the frame includes stiffening ribs.

11. An aircraft comprising:
   at least one aircraft seat track; and
   a panel support clip including,
      a frame having a first engagement surface and more than one fastener retention feature, and
      a plurality of fingers each having a second engagement surface and a panel support surface opposite the second engagement surface, each of the plurality of fingers extends from the frame so that the second engagement surface opposes the first engagement surface to form a channel and where the plurality of fingers are spaced apart from one another along the frame so as to form apertures that are disposed on an opposite side of the channel from the more than one fastener retention feature so that the apertures are substantially aligned with a respective fastener retention feature of the more than one fastener retention feature, where the respective fastener retention feature is aligned with a respective aperture to effect passage of a floor panel fastening member through the respective aperture into the respective fastener retention feature.

12. The aircraft of claim 11, wherein the more than one fastener retention feature comprises a plurality of fastener retention features longitudinally spaced from one another along the frame, a spacing between each of the plurality of fastener retention features corresponding to a hole pattern of the at least one aircraft seat track.

13. The aircraft of claim 11, wherein the more than one fastener retention feature is on a side of the frame opposite the first engagement surface.

14. The aircraft of claim 11, wherein the fastener is a threaded fastener.

15. The aircraft of claim 14, wherein the threaded fastener is one or more of a nut or a nut plate.

16. The aircraft of claim 11, wherein each panel support surface of the plurality of fingers cooperate with one or more aircraft floor panel inserts to form, with the one or more aircraft floor panel inserts, a substantially continuous support surface for an aircraft floor panel.

17. A method of supporting an aircraft floor panel, the method comprising:
   clipping a panel support clip on one or more seat track, where the one or more seat track is inserted into a channel of the panel support clip; and
   supporting at least one peripheral edge of the aircraft floor panel with finger support surfaces of the panel support clip, where the panel support clip includes a plurality of finger support surfaces that are spaced apart from one another along a frame of the panel support clip so as to form apertures that are disposed on an opposite side of the channel from more than one fastener retention feature of the panel support clip, the apertures being substantially aligned with a respective fastener retention feature of the more than one fastener retention feature of the panel support clip, where the respective fastener retention feature is aligned with a respective aperture to effect passage of a floor panel fastening member through the respective aperture into the respective fastener retention feature.

18. The method of claim 17, further comprising retaining the panel support clip on the one or more seat track by inserting a seat track flange into a channel formed between the finger support surfaces and a frame of the panel support clip.

19. The method of claim 17, further comprising aligning a floor panel insert between the finger support surfaces so that the floor panel insert contacts the one or more seat track.

20. The method of claim 19, further comprising inserting a fastener through the floor panel insert to engage the panel support clip and secure the aircraft floor panel to the one or more seat track.

* * * * *